United States Patent Office 3,663,704
Patented May 16, 1972

3,663,704
AGRICULTURAL FUNGICIDE AND BACTERI-
CIDE, A PROCESS FOR THE PREPARATION
OF SAME AND A PROCESS FOR CONTROL-
LING RICE BLAST
Katsumichi Aoki, Iwaka, Elizaburo Uchida, Sendai, and Kiichi Shinoda and Takafumi Shida, Iwaki, Japan, assignors to Kureha Kagaku Kogyo Kabushiki Kaisha, Tokyo, Japan
No Drawing. Continuation-in-part of application Ser. No. 754,744, Aug. 22, 1968. This application June 24, 1970, Ser. No. 49,509
Claims priority, application Japan, Aug. 30, 1967, 42/55,172; Apr. 22, 1968, 43/26,560
Int. Cl. A01n 9/28
U.S. Cl. 424—279
6 Claims

ABSTRACT OF THE DISCLOSURE

Novel fungicidal compositions for agricultural use containing 4,5,6,7-tetrachlorophthalide as an active ingredient and method for controlling rice blast by applying said compound or compositions thereof to rice plants. The compounds and compositions of the present invention are also useful as agricultural bactericide, particularly in the control of bacterial leaf blight in rice plants.

CROSS-REFERENCES TO RELATED APPLICATIONS

This application is a continuation-in-part application of Ser. No. 754,744, filed Aug. 22, 1968, now abandoned, and claiming priority from Aug. 30, 1967, based on Japanese application Ser. No. 55,172/67 and from Apr. 22, 1968, based on Japanese application Ser. No. 26,560/68.

This invention relates to novel fungicidal compositions for agricultural use containing 4,5,6,7-tetrachlorophthalide as an active ingredient, a method for preparing said compositions and a method for controlling rice blast by applying said compound or said composition thereof onto rice plants in cultivation.

The active ingredient contained in the compositions of the present invention, 4,5,6,7-tetrachlorophthalide, is a known compound. Its fungicidal activity has never been disclosed in the literature. However, applicants have now found that 4,5,6,7-tetrachlorophthalide demonstrates remarkable effectiveness in controlling rice blast (*Pyricularia oryzae*) without causing phytotoxical damage to rice plant.

It is, therefore, the main object of the present invention to provide a novel process of applying 4,5,6,7-tetrachlorophthalide onto rice plants to be protected from the attack of rice blast.

It is another object to provide novel fungicidal compositions containing said compound as an active ingredient, which compositions are easily and effectively applied to rice plants to be protected from said disease.

These and further objects will become more apparent as the description proceeds.

4,5,6,7-tetrachlorophthalide has hitherto been synthesized by several methods such as reducing tetrachlorophthalic anhydride by (1) zinc dust in acetic acid (Graebe, Ann. 238 330) and (2) lithium aluminum hydride in absolute et her or in anhydrous tetrahydrofuran (C.A. 52, 10001). However, when it is desired to provide 4,5,6,7-tetrachlorophthalide at a low price adapted for use as a plant protection agent, the aforementioned conventional manufacturing methods are highly inconvenient and disadvantageous, especially from economical view point.

According to the novel process proposed by the present invention, the compound 4,5,6,7-tetrachlorophthalide can be obtained in a very easy way and at a low cost.

According to the present invention, 4,5,6,7-tetrachlorophthalide (1) can be prepared in almost theoretical yield when 1,2-bis-(dichloromethyl)-3,4,5,6-tetrachlorobenzene (II) is heated in concentrated or fuming sulfuric acid.

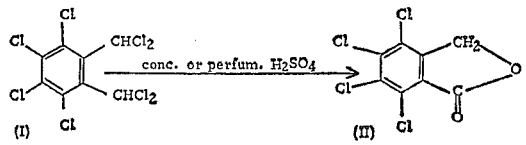

This is a new discovery which has never appeared in the literature, because ω,ω,ω',ω'-tetrabromo-o-xylene, having no halogen substituents on the benzene ring, has been recognized by those skilled in the art to yield only o-phthalic aldehyde when treated in concentrated or fuming sulfuric acid.

The starting material, 1,2-bis-(dichloromethyl)-3,4,5,6-tetrachlorobenzene is obtainable by a two step process comprising first chlorinating o-xylene with free chlorine in the presence of a catalyst such as ferric chloride and aluminum chloride or with thionyl chloride in the presence of a catalyst such as aluminum chloride and sulfur chloride, and then chlorinating the thus-obtained 3,4,5,6-tetrachloro-o-xylene by photochlorination.

In carrying out the desired synthesis, 1,2-bis-(dichloromethyl)-3,4,5,6-tetrachlorobenzene is mixed with ½ to 10 times its weight of concentrated sulfuric acid and the mixture is then heated for 0.5 to 5 hours at 80–150° C., whereupon the reaction mixture is poured into ice water to obtain the phthalide as a solid in high yield. The concentration of sulfuric acid should preferably be higher than 90%. Oleum may also be used. However, the reaction temperature must preferably be lower than that above specified.

When 4,5,6,7-teterachlorophthalide is screened as a fungicide in vitro against *Pyricularia oryzae* (the pathogen of rice blast), it demonstrates only a very weak inhibitory action against germination of conidiospores and mycelial growth.

We have surprisingly found, however, that when rice plants are first treated by applying a composition containing 4,5,6,7-tetrachlorophthalide in a concentration of about 250 to 500 p.p.m. and then the plants are inoculated with *Pyricularia oryzae*, the plants are effectively protected from said pathogen.

The novel prophylactic action of the phthalide according to the present invention lasts for a fairly long period in actual fields under strong sunshine and with occasional rain falls. The same effects are obtained in the case of bacterial leaf blight. The phthalide shows no growth-inhibitory action in vitro against *Xanthomonas oryzae* (the pathogen of rice leaf blight). However, the bacterial only slightly attacked rice plants to which the phthalide was applied in advance. Our aforementioned findings that 4,5,6,7-tetrachlorophthalide has strong fungal and bacterial controlling effectiveness are new discoveries never before disclosed in the literature.

According to our new findings, said compound can be directly applied onto rice plants in paddy fields to be protected from said fungal and bacterial attack; however, it is far more convenient and effective to apply to the plants to be protected compositions or diluted suspensions of said compositions which contain said compounds uniformly in a finely divided state.

Compositions which are to be used for said purpose consist essentially of about 3 to 50% by weight of said compound as an active ingredient uniformly admixed evenly in an inorganic carrier or a mixture of carriers and adjuvants having surface activity. The carrier acts as a solid diluent of the active ingredient in said composition and secures the uniform distribution of said active ingredient on the plants to be applied.

The compositions which are to be directly applied onto rice plants contain from 3 to 5% by weight of 4,5,6,7-tetrachlorophthalide as an active ingredient in a finely divided state, the particles having an average size of no more than 20 microns, thoroughly admixed with from 97 to 95% by weight of a finely divided inorganic inert solid carrier or mixture of said carriers. Preferably, the carrier is selected from conventional carriers normally used in the preparation of dust form agrochemical fungicides. Examples of such carriers include powdered talc, kaolin, diatomaceous earth, bentonite, clays and mixtures thereof.

Said compositions, hereinafter designated as dusts, are prepared by pulverizing and mixing of the constituents in a conventional grinding mixer and then sifting in a conventional sifting machine. Said dusts are applied directly onto rice plants in paddy fields at a rate of from 3 to 5 kg. per 10 ares according to the state of anticipated or existing degree of disease occurrence. The application may be performed either by hand, by use of the so-called dusting machine or by aeroplane.

Compositions which are applied after diluting with water as a liquid carrier and which are conventionally preferred in districts where a plentiful supply of water is available, contain from 40 to 50% by weight of said compound as an active ingredient in a finely divided state, having, that is, an average particle size of less than 20 microns and admixed thoroughly with about 55 to 45% by weight of a powdered solid and biologically inert hydrophilic carrier selected from conventional materials normally used in the preparation of agrochemical wettable powders for fungicidal use. As examples of such materials there may be mentioned bentonite, pyrophyllite, fuller's earth and clays. The balance of the composition is an organic synthetic nonionic surface active agent, such as a poly (average 3 moles) oxyethylene $C_6$ to $C_{12}$-alkyl phenyl ether, exemplified by Triton NE (a commercial product of Rohm & Hass Co.) and polyoxyethylene fatty acid ($C_6$ to $C_{12}$) ester, polyoxyethylene rosin acid ester, exemplified by G2151 (a commercial product of Atlas Co.), a mixture thereof or a mixture of said nonionic surface agent and an anionic organic synthetic surfactant such as sodium fatty alcohol ($C_8$ to $C_{12}$) sulfate, exemplified by sodium lauryl sulfate. These surface active agents may be employed in an amount of about 5% by weight.

Said compositions, hereinafter designated as wettable powders, are prepared by a conventional method for making agrochemical wettable powders comprising pulverizing and mixing the constituents well and sifting them in a conventional sifting machine. Said wettable powder, in use, is evenly dispersed in from 500 o 2,000 times its weight of water and then sprayed onto the rice plants in the paddy field at a rate of from about 100 to 200 litres per 10 ares of the field, the content of said active ingredient in said dispersion being adjusted by the amount of the water to from about 200 to 1000 p.p.m. according to the state of anticipated or existing degree of disease occurrence.

Still other compositions which are applied after diluting with water contain from about 20 to 30% by weight of said compound as an active ingredient dissolved in about 70 to 80% by weight of an organic solvent, such as o-chlorophenol, the balance being an organic synthetic surface active agent, exemplified by Triton NE. Said compositions, hereinafter designated as emulsive concentrates, in use, are diluted with water to make an emulsion containing from about 200 to 1000 p.p.m. of said active ingredient and are sprayed onto rice plants at a rate of from about 100 to 200 litres per 10 ares of paddy field.

Said wettable powders and emulsive concentrates, after dilution are sprayed by means of a conventional sprayer for agricultural use. The appropriate season of applying said compound or said composition containing said compound, of course, depends on the trend and method of cultivation of the particular rice-cultivating country and the extent of occurrence of rice blast. However, generally speaking it is preferable to apply them just after the time when the initial occurrence is noticed in the field, or prophylactically at the time when the occurrence is forecasted. When the occurrence is severe it is preferable to apply said compound or compositions twice or more every ten days at a heavier rate than designated hereinbefore, because there is no danger of damaging the rice plants or other nearby plants due to said compound. The following examples are illustrative of the various embodiments of the present invention. These, however, should not be construded as limiting the invention in any way.

EXAMPLE 1

Synthesis of the starting material, 1,2-bis(dichloromethyl)-3,4,5,6-tetrachlorobenzene 199 grams of 3,4,5,6-tetrachloro-o-xylene which was obtained by the method of P.G. Harvey (J. Appl. Chem. 4, 325) were dissolved in 3000 ml. of carbon tetrachloride.

After adding 1 gram of benzoyl peroxide to the solution, chlorine gas was introduced into the solution for 7 hrs. at the rate of 1 mol/hr. under ultra violet irradiation from a 100-watt high pressure mercury lamp.

The solution was then condensed and cooled to separate out 252 grams of 1,2-bis-(dichloromethyl)-3,4,5,6-tetrachlorobenzene melting at 150–151° C. (yield 81% theo.)

*Analysis.*—Calcd. as $C_8H_2Cl_8$ (percent): Cl, 74.31. Found (percent): Cl, 74.03.

λ max. (UV) microns: 299 mμ (ε: 1090); 310.5 mμ (ε: 1310).

These observed values coincide substantially with those of Harvey's.

EXAMPLE 2

Synthesis of 4,5,6,7-tetrachlorophthalide 96 grams of 1,2-bis-(dichloromethyl)-3,4,5,6-tetrachlorobenzene, prepared as described in Example 1, were added to 800 grams of 95% sulfuric acid and the mixture was heated for 3 hrs. at 130–140° C.

After cooling to room temperature, the reaction mixture was poured into 2000 ml. of ice-water to obtain pale yellow fine precipitates. The precipitates were filtered, washed several times with water and then once with methanol, and finally air-dried. Yield: 67 grams (98.5% of theo.).

After repeated recrystallization from benzene, we obtained white scales melting at 207–208° C. No depression of melting point was observed when co-melted with an authentic specimen prepared by the known method disclosed in the aforementioned literature. The IR-spectra of the both specimens coincided substantially with each other.

EXAMPLE 3

Synthesis of 4,5,6,7-tetrachlorophthalide 30 grams of 1,2-bis-(dichloromethyl)-3,4,5,6-tetrachlorobenzene prepared as described in Example 1 were added to 180 grams of 10%-fuming sulfuric acid. The mixture was then heated for 2 hrs. at 100° C. to react. After cooling to room temperature, the reaction mixture was poured into ice-water. The precipitate was filtered and dried. 20.4 grams of yellow colored product were obtained. According to gas chromatography the content of 4,5,6,7-tetrachlorophthalide in the product amounted to 76%.

EXAMPLE 4

Preparation of fungicidal wettable powder 50 parts by weight of 4,5,6,7-tetrachlorophthalide, 2 parts by weight of polyoxyethylene alkylaryl ether, 1 part by weight of a mixture of polyoxyethylene aliphatic carboxylate and polyoxyethylene rosin acid ester, and 47 parts by weight of clay were each pulverized and mixed well together to obtain a wettable powder. The powder was diluted with water for application onto plants to be protected.

EXAMPLE 5

Preparation of fungicidal wettable powder 50 parts by weight of 4,5,6,7-tetrachlorophthalide of average size less than 20 microns and 5 parts by weight of a mixture of synthetic organic surface active agents consisting of 2.5 parts by weight of sodium lauryl sulfate and 2.5 parts by weight of polyoxyethylene nonyl phenyl ether (containing about three oxyethylene groups) were well mixed with pulverization. To this mixture, 45 parts by weight of powdered attapulgite clay was added and the whole material was mixed well and then sifted with a mechanical sifter having a 200 mesh sieve. The wettable powder, thus prepared, is easily dispersed by agitation into about 500 to 2000 times by weight of water to obtain a uniform suspension which is ready for application by a sprayer onto rice plants to be protected from the attack of rice blast.

EXAMPLE 6

Preparation of a fungicidal dust 3 parts by weight of 4,5,6,7-tetrachlorophthalide and 97 parts by weight of clay were each pulverized and mixed well together to obtain a fungicidal dust. This dust may be applied directly onto plants to be protected.

EXAMPLE 7

Method for protecting rice plants from rice blast and in vivo test results

Pathogen, inoculated: "P-2" (Noken), *Pyricularia oryzae* rice plant, variety: "Sasanishiki."

Test method: Onto potted rice plants in the four-leaf stage, grown in dry soil containing excess nitrogen, a diluted aqueous suspension of the wettable powder obtained in Example 3 was sprayed at a rate of 500 p.p.m. of the active ingredient. 24 hrs. and 4 days after the application, respectively, the plants were inoculated with a suspension of conidiospores of *Pyricularia oryzae*. The potted plants were held in a moisture room kept at 20–25° C. and 100% R.H. for 24 hrs. and were then transferred to a conditioned room kept at 20–25° C., and R.H. of over 85%.

Five days after the inoculation, the number of developed colonies on the leaves of the rice plant was counted to determine the disease-suppressing effect of the fungicidal composition as compared to those on the control lots treated with known fungicides and equally inoculated. The test results were as follows:

| Fungicide | Conc. of active ingredient, p.p.m. | Disease-suppressing effect [1] (percent) | |
|---|---|---|---|
| | | 24 hrs. after inoculation | 4 days after inoculation |
| A | 500 | 97.0 | 89.1 |
| B | 500 | 97.2 | 88.6 |
| C | 10 (as Hg) | 90.6 | |
| C | 20 (as Hg) | | 82.4 |
| D | | 0 | 0 |

[1] After application of fungicide.

NOTE.—A: 4,5,6,7-tetrachlorophthalide, wettable powder composition; B: Pentachlorobenzylalcohol, wettable powder composition; C: Phenyl mercuric acetate, emulsive concentrate; D: No fungicide applied.

EXAMPLE 8

Method of protecting rice plants from bacterial leaf blight and the test results Onto potted rice plants (variety Sasanishiki) in the five-leaf stage and grown in a nitrogen excess dry soil, a diluted aqueous suspension of the wettable powder obtained in Example 4 was sprayed at a rate of 500 p.p.m. of the active ingredient. 24 hrs. and 4 days after this application the leaves of the plant were punch-inoculated with a suspension of *Xanthomonas oryzae*. The pots were kept for 14 days at 25–30° C. and the length of the lesion developed from the punched hole was assessed to determine the effctiveness of bacetricides. Comparison tests with other antibacterial compositions were also run. The test results were as follows:

| Bactericide | Conc. (p.p.m.) of active ingredient | Effectiveness of disease suppression [1] | |
|---|---|---|---|
| | | 24 hrs. after innoculation | 4 days after innoculation |
| A | 500 | 90.2 | 80.3 |
| E | 143 | 89.4 | 80.0 |
| F | 180 | 98.7 | 91.6 |

NOTE.—A: 4,5,6,7-tetrachlorophthalide, wettable powder composition; E: Acetylene dicaraboxyamide, wettable powder composition; F: Chloramphenicol plus phenyl mercuric acetate, wettable powder mixture.

[1] After addition of antibacterial composition.

According to the above two findings on the in vivo effectiveness of the compound of the present invention, the following field trials were performed to confirm the out-of-door effectiveness:

EXAMPLE 9

Onto a dry seeding bed of rice plants (variety Sasanishiki) in the three-leaf stage and grown on a soil of excess nitrogen condition a 1500 times diluted aqueous suspension of the wettable powder of Example 4 was sprayed at a rate of 10 litres per ares (conc. 333 p.p.m.). After 4 days from the application a suspension of condiospores of *Pyricularia oryzae* cultivated on unhulled rice culture medium was inoculated. Each 250 plants randomly picked up from each test plot of 1 m.$^2$ were assessed to determine the number of lesions. The same test was run with other fungicides for comparison. The results were as follows:

| Fungicide | Conc. (p.p.m.) of active ingredient | Total number of lesions on 250 plants |
|---|---|---|
| A | 333 | 68 |
| B | 500 | 100 |
| C | 20 (as Hg) | 119 |
| D | | 1,441 |

See note at bottom of table in Example 10.

EXAMPLE 10

Onto each seeding bed of rice plants (variety Sasanishiki) which had already suffered from rice blast (the first observation of lesions of natural infection being on July 16, 1967) a 1500 times diluted aqueous suspension of the wettable powder obtained in Example 4 at a rate of 10 litres per ares and the dust obtained in Example 5 at a rate of 300 grams per ares were applied respectively, twice (July 18 and 22, 1967). The phytopathological state of the rice plants was inspected four times (July 20, 25 and 29, and Aug. 2, 1967) and the results were evaluated on a scale of eleven grades ("0"-grade: no damage, and "10"-grade: completely killed). The following results show the average effectiveness taken from 3 plots, as well as comparisons of the effectivenes of other fungicides.

| Fungicide | Conc. of a.i. | Grade of plant damage | | | |
|---|---|---|---|---|---|
| | | July 20 | July 25 | July 29 | August 2 |
| A | 333 p.p.m | 2.2 | 3.7 | 5.0 | 5.6 |
| A' | 3% | 1.5 | 3.3 | 3.7 | 4.0 |
| B | 500 p.p.m | 2.7 | 4.3 | 6.0 | 6.6 |
| B' | 4% | 2.5 | 5.0 | 7.0 | 8.3 |
| C | 25 p.p.m. as Hg | 2.8 | 7.0 | 9.0 | 9.3 |
| C' | 0.25% as Hg | 1.2 | 4.3 | 7.3 | 8.6 |
| D | | 3.0 | 8.1 | 9.8 | 10.0 |

NOTE.—Fungicide composition employed in Examples 9 and 10— A: 4,5,6,7-tetrachlorophthalide, wettable powder composition; B: Pentachlorobenzylalcohol, wettable powder composition; C: Phenylmercuric acetate, emulsive concentrate; A': Dust, 4,5,6,7-tetrachlorophthalide; B': Dust, pentachlorobenzylalcohol; C': Dust, phenyl mercuric acetate.

As can be seen from the above results the compound of the present invention demonstrated better and longer effectiveness in controlling rice blast resulting from natural infection than from artificial inoculation, this fact demonstrating the actual preferable performance of the compound of the present invention.

Although the invention has been described by reference to only a limited number of numerical examples, various changes and modifications will occur to any person skilled in the art after thoroughly reading the foregoing specification. These changes and modifications are within the scope of the present invention, so far as they fall within the scope of the appended claims.

What is claimed is:

1. A fungicidal composition for controlling rice blast comprising an inert inorganic carrier and from about 3 to 50% by weight of the total composition of 4,5,6,7-tetrachlorophthalide as the active ingredient.

2. A fungicidal composition for controlling rice blast consisting essentially of about 3 to 5% by weight of 4,5,6,7-tetrachlorophthalide as the active ingredient in finely divided state and about 97 to 95% by weight of a finely divided inert organic carrier selected from the group consisting of talc, kaolin, bentonite, diatomaceous earth clays and mixtures thereof.

3. A fungicidal wettable powder composition consisting essentially of (1) about 40 to 50% by weight of finely divided 4,5,6,7-tetrachlorophthalide as the active ingredient (2) about 5% by weight of an organic surface active agent selected from the group consisting of polyoxyethylene $C_6$ to $C_{12}$ alkyl phenyl ether, polyoxyethylene $C_6$ to $C_{12}$ fatty acid ester, polyoxyethylene rosin acid ester, sodium $C_8$ to $C_{12}$ fatty alcohol sulfate and mixtures thereof, and (3) about 55 to 45% by weight of a powdered solid and biologically inert hydrophilic carrier selected from the group consisting of finely divided bentonite, pyrophyllite, attapulgite clay and fuller's earth.

4. A method for controlling rice blast on rice plants comprising applying a fungicidally effective amount of 4,5,6,7-tetrachlorophthalide onto the rice plants thereby protecting the plants from the attack of the disease.

5. A method of controlling rice blast on rice plants comprising the application of a fungicidal composition comprising an inert inorganic carrier and has been inserted in place thereof about 3 to 5% by weight of 4,5,6,7-tetrachlorophthalide as the active ingredients directly onto the rice plants to be protected from the attack of rice blast at the rate of about 3 to 5 kg. of said compound per 10 ares of the paddy field.

6. A method of controlling bacterial leaf blight on rice plants comprisnig applying an antibacterially effective amount of 4,5,6,7-tetrachlorophthalide onto the rice plants, thereby protecting the plants from the attack of the disease.

References Cited
UNITED STATES PATENTS 2,989,541   6/1961   Wheeler et al. ____ 424—285 X
2,817,668   12/1957  Wheeler et al. ____ 424—285 X

OTHER REFERENCES

Chemical Abstracts 52: 10001g, 1958.

ALBERT T. MEYERS, Primary Examiner

L. SCHENKMAN, Assistant Examiner